US009329292B2

(12) United States Patent
Dellinger et al.

(10) Patent No.: US 9,329,292 B2
(45) Date of Patent: May 3, 2016

(54) SYSTEM AND METHOD FOR PREVENTING CAVITATION IN CONTROLLED-FREQUENCY MARINE SEISMIC SOURCE ARRAYS (71) Applicants: Joseph Anthony Dellinger, Houston, TX (US); Mark Harper, Cambridge (GB)

(72) Inventors: Joseph Anthony Dellinger, Houston, TX (US); Mark Harper, Cambridge (GB)

(73) Assignee: BP Corporation North America Inc., Houston, TX (US)

( * ) Notice: Subject to any disclaimer, the term of this patent is extended or adjusted under 35 U.S.C. 154(b) by 277 days.

(21) Appl. No.: 13/780,043

(22) Filed: Feb. 28, 2013

(65) Prior Publication Data
US 2014/0241117 A1 Aug. 28, 2014

(51) Int. Cl.
*G01V 1/38* (2006.01)
*G01V 1/00* (2006.01)

(52) U.S. Cl.
CPC .............. *G01V 1/3808* (2013.01); *G01V 1/005* (2013.01); *G01V 1/006* (2013.01); *G01V 2210/127* (2013.01)

(58) Field of Classification Search
CPC ..... G01V 1/005; G01V 1/006; G01V 1/3808; G01V 1/3861; G01V 2210/127
USPC .......................................................... 367/15
See application file for complete search history.

(56) References Cited

U.S. PATENT DOCUMENTS

| | | | |
|---|---|---|---|
| 6,418,079 B1 * | 7/2002 | Fleure | 367/40 |
| 6,493,636 B1 | 12/2002 | Dekok | |
| 7,257,049 B1 | 8/2007 | Laws et al. | |
| 8,792,300 B2 | 7/2014 | Sallas | |
| 8,902,698 B2 | 12/2014 | Hegna et al. | |
| 8,907,506 B2 | 12/2014 | Marin | |
| 8,950,263 B2 | 2/2015 | Giordano et al. | |
| 2004/0136266 A1 | 7/2004 | Howlid et al. | |
| 2007/0133354 A1 | 6/2007 | Bagaini et al. | |
| 2008/0253226 A1 | 10/2008 | Tenghamn et al. | |
| 2010/0008184 A1 | 1/2010 | Hegna et al. | |

(Continued)

FOREIGN PATENT DOCUMENTS

| | | |
|---|---|---|
| EP | 2267486 | 12/2010 |
| GB | 2495801 | 4/2013 |

(Continued)

OTHER PUBLICATIONS

Ozdogan Yilmaz, "Seismic Data Processing", Society of Exploration of Geophysicists, 1987, Chapter 1, pp. 9-80, Tulsa, Oklahoma, USA.

(Continued)

*Primary Examiner* — Daniel L Murphy
(74) *Attorney, Agent, or Firm* — Gunnar Heinisch (57) ABSTRACT

There is provided herein a method of seismic acquisition that utilizes an arrangement of marine sources where each source is positioned at a water depth shallow enough for the surface ghost notch to fall at a frequency greater than or equal to the maximum radiated frequency of interest. If the marine seismic source has a ratio of signal bandwidth to maximum frequency that is less than one half, then it is possible to deploy it at a greater depth at which ghost notches fall below and above its frequency band but not in it. Further, by placing two or more sources at different depths for the same frequency, any undesired nulls in the radiation pattern caused by the deeper tow can be filled in.

7 Claims, 8 Drawing Sheets

(56) References Cited

U.S. PATENT DOCUMENTS

| | | |
|---|---|---|
| 2011/0017543 A1 | 1/2011 | Hopperstad et al. |
| 2011/0085416 A1 | 4/2011 | Sallas |
| 2011/0162906 A1 | 7/2011 | Harper et al. |
| 2012/0063263 A1 | 3/2012 | Kamata et al. |
| 2012/0147699 A1 | 6/2012 | Dellinger et al. |
| 2012/0155217 A1 | 6/2012 | Dellinger et al. |
| 2013/0021875 A1 | 1/2013 | Eick et al. |
| 2013/0100766 A1 | 4/2013 | Teyssandier et al. |
| 2013/0155810 A1 | 6/2013 | Dowle et al. |
| 2013/0193693 A1 | 8/2013 | Marin et al. |
| 2013/0201789 A1 | 8/2013 | Phillips et al. |
| 2013/0264141 A1 | 10/2013 | Wei et al. |
| 2013/0308422 A1 | 11/2013 | Eick et al. |
| 2013/0333974 A1 | 12/2013 | Coste et al. |
| 2014/0043937 A1 | 2/2014 | Teyssandier et al. |
| 2014/0104986 A1 | 4/2014 | Teyssandier et al. |
| 2014/0112097 A1 | 4/2014 | Dowle et al. |
| 2014/0226439 A1 | 8/2014 | Tenghamn |
| 2014/0254312 A1 | 9/2014 | Dowle et al. |
| 2014/0254313 A1 | 9/2014 | Dowle et al. |

FOREIGN PATENT DOCUMENTS

| | | |
|---|---|---|
| GD | 2495801 | 4/2013 |
| WO | WO 2010/082126 A2 | 7/2010 |
| WO | WO 2012/004587 A2 | 1/2012 |
| WO | 2012078966 | 6/2012 |
| WO | 2014076076 | 5/2014 |

OTHER PUBLICATIONS

Ozdogan Yilmaz, "Seismic Data Processing", Society of Exploration of Geophysicists, 1987, Chapter 6, pp. 384-427, Tulsa, Oklahoma, USA.
Amundsen, Lasse et al: "GEO Expro Marine Seismic Sources Part I," Geo ExPro, vol. 7, No. 1-2010, Feb. 28, 2010, pp. 32-34, XP055099080, London.
PCT Search Report dated Feb. 24, 2015.

* cited by examiner

FIG. 7  SECTIONS AT SIX POINTS ACROSS GHOST BAND

FIG. 8  SECTIONS AT SIX POINTS ACROSS GHOST BAND

SYSTEM AND METHOD FOR PREVENTING CAVITATION IN CONTROLLED-FREQUENCY MARINE SEISMIC SOURCE ARRAYS

This invention relates to the general subject of seismic exploration and, in particular, to methods for acquiring seismic and other signals that are representative of the subsurface for purposes of seismic exploration and/or surveillance.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared, any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common Typical trace lengths are 5-16 seconds, which corresponds to 2500-8000 samples at a 2-millisecond interval. Conventionally each trace records one seismic source activation, so there is one trace for each live source-receiver combination. In a typical 2-D survey, there will usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

Controlled-frequency seismic sources are sources that are adjustable to produce a variety of different source signatures. This includes swept-frequency sources which emit a sinusoidal signal whose amplitude and frequency can be independently controlled. Examples of such include seismic land and marine vibrators. Swept-frequency sources may be preferable to conventional impulsive seismic sources for some geophysical applications, for example to minimize disturbance to nearby facilities by minimizing the peak emitted sound pressure from the sources. The ability to finely control the source frequency spectrum is also useful, as it allows the source to be optimized to meet the particular imaging challenge at hand. Conventionally, swept-frequency marine seismic sources are deployed at a depth such that the lowest non-zero-frequency spectral notch introduced by the surface ghost reflection does not occur within the frequency band of interest. For example, a source with a top frequency of 100 Hz would not be deployed deeper than about 7.5 m.

Although controlled-frequency seismic sources are quite useful in certain contexts, they are not without their challenges. For example, in order that a controlled-frequency source array should match an airgun array in output energy, the acoustic pressure at the faces of the individual sources is likely to be very high, well in excess of one bar. If deployed at too shallow a depth in the water (e.g. 7.5 m) cavitation can occur at the sources during the collection of a marine survey. The term "cavitation" refers to the formation of cavities (bubbles of vacuum or low-pressure vapor) in a fluid and the subsequent collapse thereof. The collapse generates a shock wave by implosion and the pressure wave(s) that result will be sensed and recorded by the hydrophones that are intended to collect the seismic survey data. The resulting pressure wave distorts or contaminates the recorded seismic signal making it more difficult to obtain a clear image of the subsurface.

Cavitation during a marine seismic survey alters the acoustic output of the array, rendering it less controllable; creates broadband noise which is environmentally undesirable; and can damage the sources themselves. One technique that has been used to minimize cavitation is to apportion the frequency band of interest among multiple sources, with each source in the array towed at an optimal depth for its frequency range. Even so, cavitation is still often present for the higher-frequency source elements in the array, which must be towed at the shallowest depths.

Heretofore, as is well known in the seismic acquisition and processing arts, there has been a need for a system and method that provides a method of reducing the likelihood of or preventing cavitation in controllable frequency marine seismic source arrays that does not suffer from known disadvantages. Accordingly, it should now be recognized, as was recognized by the present inventors, that there exists, and has existed for some time, a very real need for a method of seismic data processing that would address and solve the above-described problems.

The description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY

According to a preferred aspect of the instant invention, there is provided a system and method for acquiring seismic data using a controlled frequency seismic source/array.

More particularly, it is customary to deploy a marine seismic source at a depth shallow enough for the surface ghost notch to fall at a frequency greater than or equal to the maximum radiated frequency of interest. See, for example, Laws et al., 2007, "Method of seismic surveying, a marine vibrator arrangement, and a method of calculating the depths of seismic sources", U.S. Pat. No. 7,257,049, the disclosure of which is incorporated herein by reference as if fully set out at this point. If the marine seismic source has a ratio of signal bandwidth to maximum frequency that is less than one half then it is possible to deploy it at a greater depth, so that ghost notches fall below and above its frequency band but not in it. This can be advantageous when deploying controlled-frequency sources and in particular swept-frequency sources because it reduces the risk of cavitation.

With an appropriate choice of limited-bandwidth sources, the depths can be arranged so that they are approximately equal, which has advantages for towing. By placing two or more sources at different depths for the same frequency, any undesired nulls in the radiation pattern caused by the deeper tow can be filled in.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Figure 1:
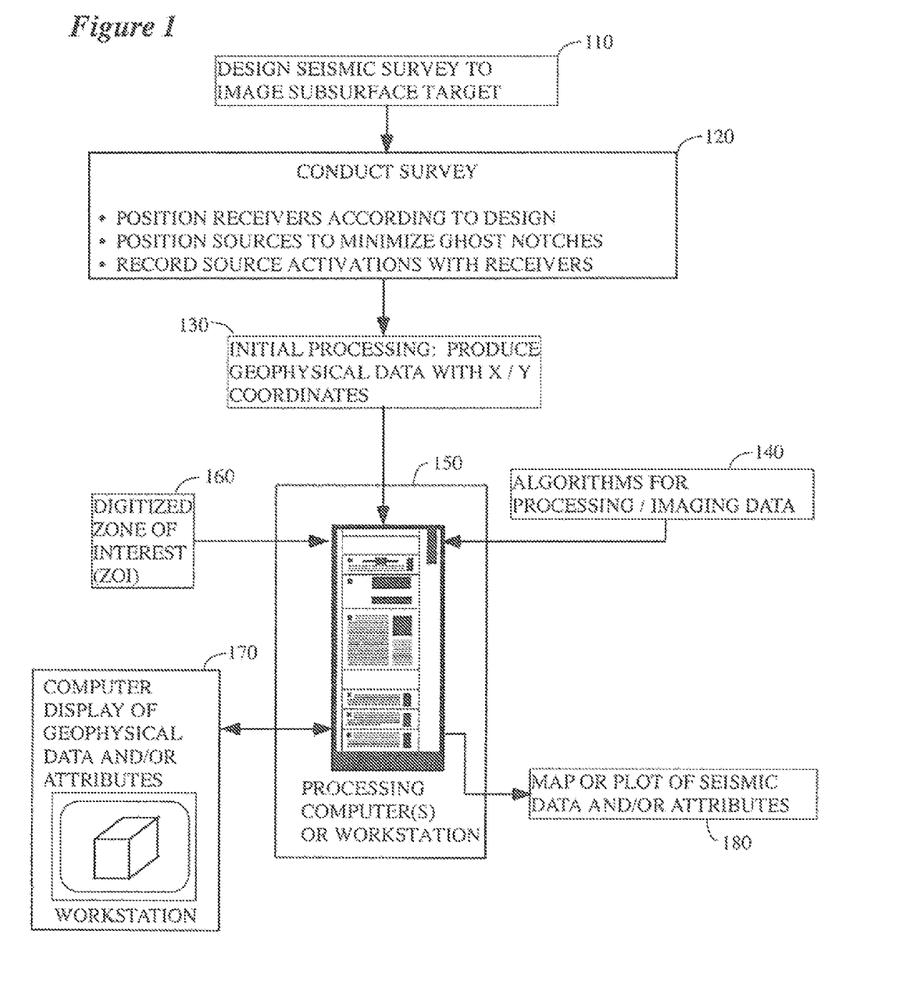
FIG. 1 illustrates the general processing environment of the instant invention.

FIG. 1 illustrates a general environment in which the instant invention would typically be used. A seismic survey is designed 110 by the explorationist to cover a subsurface region of economic interest. Field acquisition parameters (e.g., shot and receiver spacing and positioning, line spacing, fold, etc.) are typically selected in conjunction with this step, although it is common to modify the ideal design parameters slightly (or substantially) in the field to accommodate the realities of conducting the survey.

Seismic data (i.e., seismic traces) are collected in the field 120 over a subsurface target of potential economic importance and are typically sent thereafter to a processing center 150 where the traces will be subjected to various algorithms to make them more suitable for use in exploration. In some cases, there may be some amount of initial data processing performed while the data are still in the field and this is becoming more common and feasible given the computing power that is available to field crews. The instant invention would typically be implemented as part of the data acquisition step 120, although at least a tentative scheme for positioning the seismic sources will likely be determined during the design phase 110.

In the processing center a variety of preparatory processes 130 are typically applied to the seismic traces to make them ready for use by the explorationist. The processed traces would then be made available for use by the instant invention and might be stored, by way of example only, on hard disk, magnetic tape, magneto-optical disk, DVD disk, or other mass storage means.

The at least a portion of the instant invention would best be implemented in the form of a computer program 140 that has been loaded onto a programmable computer in processing center 150 where it is accessible by a seismic interpreter or processor. Note that a processing center 150 suitable for use with the instant invention would typically include mainframes, servers, workstations, or super computers, or more generally, a computer or network of computers that provide for parallel and massively parallel computations, wherein the computational load is distributed between two or more processors. As is also illustrated in FIG. 1, in a preferred arrangement some sort of digitized zone of interest model 160 may be specified by the user and provided as input to the processing computer program. In the case of a 3-D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is such that those skilled in the art will recognize that this might be done any number of ways.

A program 140 that might be useful in implementing some portion of the instant invention (e.g., a modeling program) can be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the post processing aspects of the instant invention can be made part of a larger package of software modules that is designed to read the raw seismic data and output processed seismic traces. After acquisition by the instant methods, the resulting traces can then typically be sorted into gathers, stacked, and displayed either at a high resolution color computer monitor 170 or in hard-copy form as a printed seismic section or a map 180. The seismic interpreter can then use the displayed images to assist him or her in identifying subsurface features conducive to the generation, migration, or accumulation of hydrocarbons.

Figure 2:
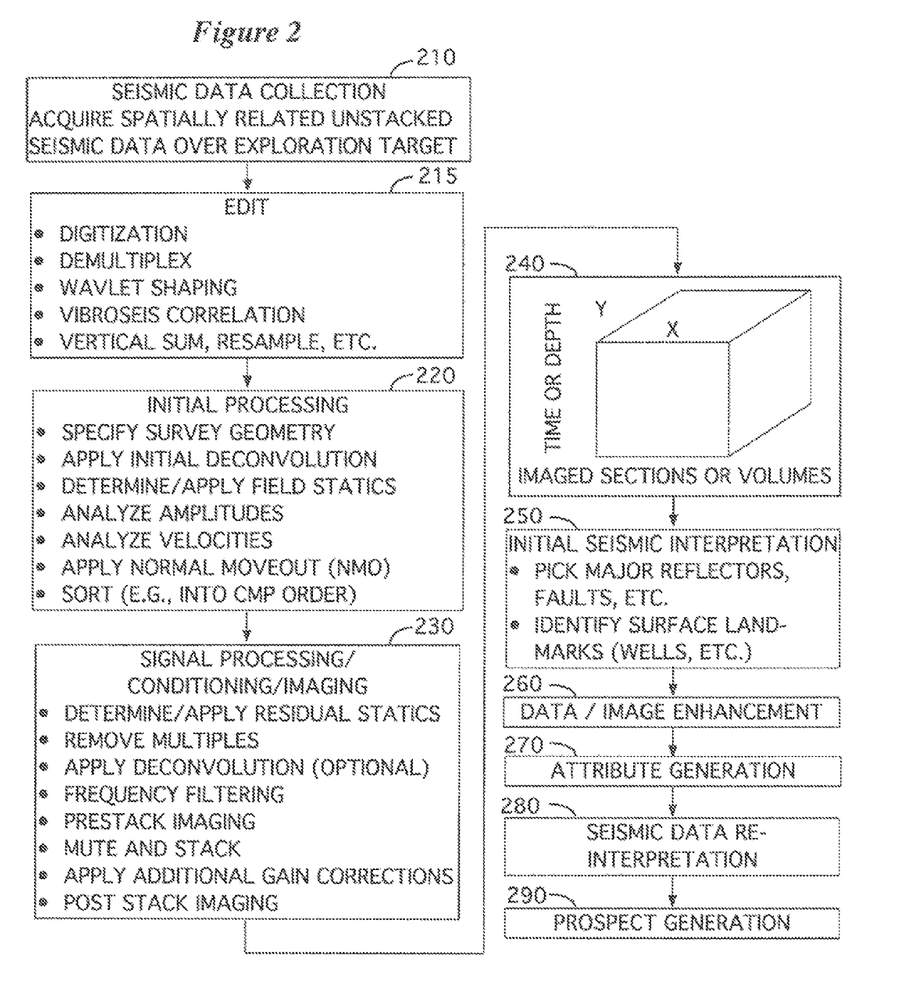
FIG. 2 contains a processing sequence suitable for use with data obtained by the instant invention.

As was indicated previously, some aspects of the instant invention will preferably be made a part of and incorporated into a conventional seismic processing sequence of the sort generally described in FIG. 2. Those of ordinary skill in the art will recognize that the processing steps illustrated in this figure are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2-D or 3-D seismic survey is conducted over a particular volume of the earth's subsurface (step 210). The data collected in the field consist of unstacked (i.e., unsummed) seismic traces that contain digital information representative of the volume of the earth lying beneath the survey. General methods by which such data are generally obtained and processed into a form suitable for use by seismic processors and interpreters are well known to those of ordinary skill in the art.

The purpose of a seismic survey is to acquire a collection of spatially related seismic traces over a subsurface target of some potential economic importance. Data that are collected by the methods disclosed herein might consist of, for purposes of illustration only, an unstacked 2-D seismic line, an unstacked 2-D seismic line extracted from a 3-D seismic survey or, preferably, an unstacked 3-D portion of a 3-D seismic survey. The invention disclosed herein is most effective when used to acquire to a group of stacked seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces can conceivably be used.

In the case of marine seismic, such data are typically acquired via a towed streamer survey. In a conventional arrangement a receiver vessel tows several hydrophone cables behind it (i.e., several "streamers" in the argot of the trade) as it travels over a subsurface area of interest. Each streamer will typically contain several hundred hydrophones which are designed to sense seismic signals that have been reflected from subsurface rock formations and other density contrasts.

At periodic intervals, a seismic source (that might also towed by that same vessel and located directly behind it) is activated. The source energy propagates downward through the water and penetrates into the ocean bottom, where it is ultimately encounters subsurface rock formations that reflect part of the down going energy back up toward the receivers. Recordings are made of the hydrophones that are carried by the streamer for a short period of time after the source is activated (e.g. for 10 to 20 seconds) at a sample interval that is typically selected by the operator.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2-D data, a stacked seismic line for use in the exploration for hydrocarbons within the subsurface of the earth.

As is further suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

According to a first embodiment of the instant invention, there is provided a method of marine seismic acquisition that allows a swept-frequency source to be towed deep enough to avoid cavitation, while still avoiding the ghost notch that would conventionally be a problem for deeply towed sources in marine seismic surveys.

By way of explanation, in a marine environment, upgoing waves from the seismic source(s) reflect off of the ocean's surface and are sensed by the submerged receivers. This unwanted reflected arrival is known as a ghost event. The ghost event has a relatively small time delay relative to the downgoing primary source and, rather than appearing as a separate (and separable) event on the seismic record, it overlaps with the primary reflections. The resulting mixed wavelet has notches in the amplitude spectrum at a frequency that depends on the source depth. Of course, if the source depth varies during the survey (as it can when surface waves are present) the notches will tend to change in frequency location over time. Optimum source depth has traditionally been a tradeoff between moving the ghost notch out of the seismic band and avoiding near-surface wave action. Thus, source depth control is important in marine surveys.

The ghost notches cause the spectrum of the sound radiated downwards to be divided into bands separated by equally spaced frequencies at which the power of the downward-radiated sound is zero or greatly attenuated. These notch frequencies are conventionally given by the formula $$f(n, d) = \frac{n * c}{2 * d},$$

where c is the speed of sound in water (typically taken as 1500 m/s), d is the depth of the source, and n is a positive integer or zero. For purposes of the instant disclosure, the frequency band between f(0, d) and f(1, d) will be referred to as the first ghost band, the frequency band between f(1, d) and f(2, d) as the second ghost band, and so forth. So, for example, a source that is positioned 50 meters deep is in the first ghost band from 0 to 15 Hz, the second ghost band from 15 to 30 Hz, and the third ghost band from 30 to 45 Hz.

Figure 3:
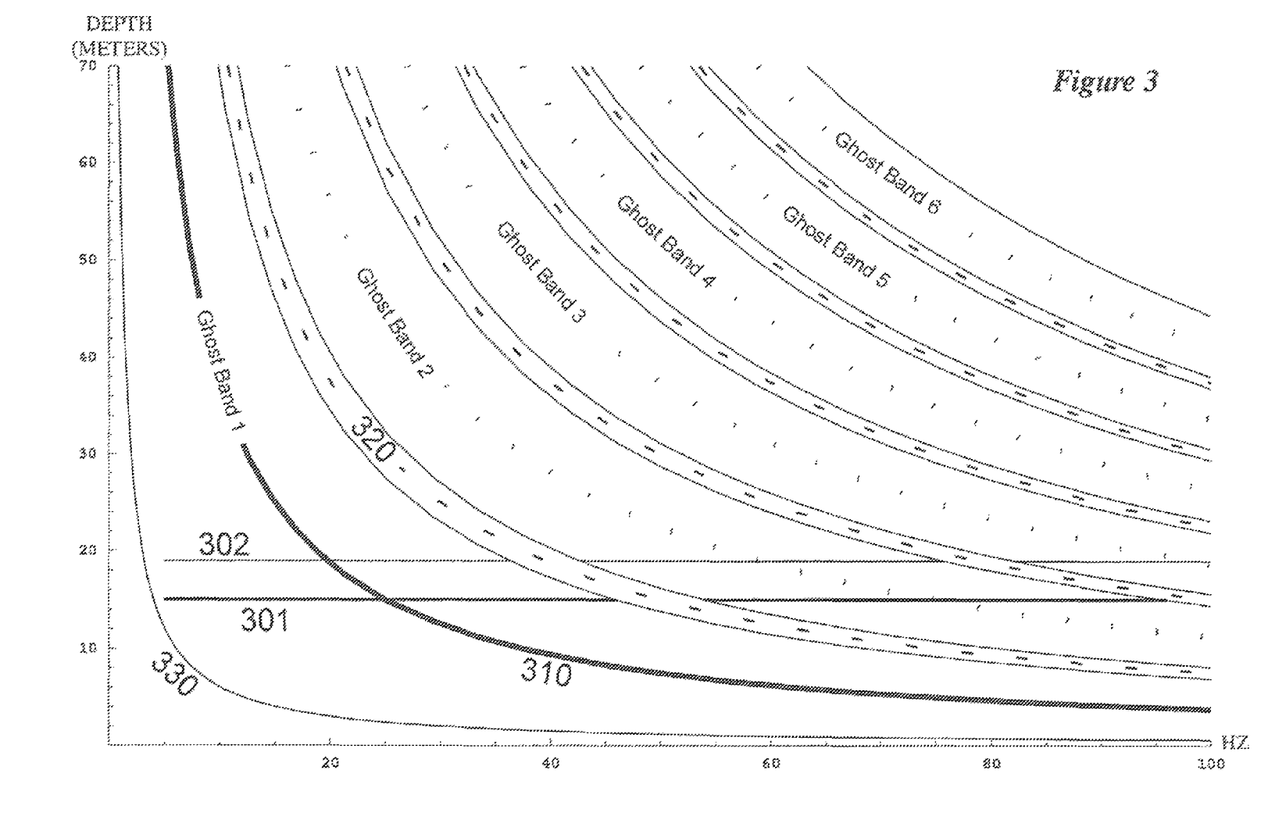
FIG. 3 illustrates how ghost bands 1 through 6 are disposed as functions of source depth and frequency. The central line of each ghost band indicates combinations of frequency and depth for which downgoing energy from the source maximally benefits from constructive summation with the source's ghost reflecting off the sea surface. The broader ghost bands about the central lines indicate a range of frequencies and depths over which downgoing energy from a source is not excessively attenuated by summation with its ghost.

FIG. 3 illustrates the ghost bands as functions of depth and frequency. The horizontal lines 301 and 302 represent two conventional broad-band sources at depths of 15 and 19 meters, respectively. The heavy black line "Ghost band 1", 310, shows the shallowest optimal tow depth as a function of frequency. At this optimal tow depth the direct downgoing wave from the source and the ghost reflection are in phase, and the amplitude of the source signal plus the ghost reflection (the "source amplification factor") reaches its maximum value of 2. This curve marks the center of ghost band 1. For higher frequencies, or deeper depths, a notch is encountered, shown by dotted line 320. A source at that frequency and depth has its downgoing energy nulled out by the ghost reflection because the ghost reflection phase is 180 degrees different from the source. In other words, the source amplification factor is 0. This notch frequency marks the boundary between adjacent ghost bands.

In practice, it is desirable to avoid getting too close to the notch. The finite width of the band around the first notch in FIG. 3 shows the limits at which the source amplification factor is less than 0.5. This is the "notch zone" for a minimum acceptable source amplification factor of 0.5. Note there is also a zeroeth notch at zero depth for all frequencies, or at zero frequency for all depths. The curve 330 shows the minimum frequency and depth at which the source amplification factor is above 0.5, representing the upper limit of the zeroeth notch zone.

Ideally, a seismic source should be deployed at a depth d such that none of the ghost notch frequencies f(n, d) fall within the frequency range that the source is desired to radiate downwards. So, for example, in FIG. 3 if only the shallower broadband source 301 were used, it would have a useful frequency range spanning approximately 5 to 45 Hz. A strategy to avoid this limitation is to have broadband sources at two different depths such that their notch zones do not overlap for any frequency, as shown by broadband sources 301 and 302 in FIG. 3. In conjunction with the two sources there must also be some way to separate the signals from them so they can be processed separately and then combined. There are many possible ways to do this. See, for example, Hegna and Parks, 2010, "Method for acquiring and processing marine seismic data to extract and constructively use the up-going and down-going wave-fields emitted by the source(s)", U.S. Patent Application 2010/0008184, the disclosure of which is incorporated herein by reference as if fully set out at this point.

The instant invention achieves this goal in a novel way, by using swept-frequency sources with individual frequency bands that are not identical, e.g., an array where at least one of the sources generates a seismic signal at a relatively high frequency and at least one of the sources generates at a relatively low frequency.

According to an embodiment, the instant invention places higher-frequency sources in higher ghost bands and thus at greater depths in order to avoid cavitation. Any one source may be placed in any ghost band that at least approximately meets two criteria: the band must be wide enough to contain the entire range of frequencies the source is designed or expected to radiate, and the source depth must be great enough to avoid cavitation. The wider the bandwidth of the source, the greater the restriction of possible tow depths imposed by the first criterion.

For purposes of illustration only, the mathematics will be simplified by considering the case of a minimum source amplification of 0. Then referring to FIG. 3, a source radiating at 20 Hz lies within the first ghost band from the surface to a depth of 37.5 meters, the second ghost band from 37.5 to 75 meters, and the third ghost band from 75 to 112.5 meters. Similarly, a source that radiates at 30 Hz lies within the first ghost band from the surface to a depth of 25 meters, the second ghost band from 25 meters to 50 meters, and the third ghost band from 50 to 75 meters. Now consider a swept-frequency source that radiates from 20-30 Hz. It must remain within the same ghost band for all frequencies from 20 to 30 Hz in order not to have a notch within its bandwidth. Comparing the depth ranges of the ghost bands for 20 and 30 Hz, we see that this source lies entirely within the first ghost band for tow depths ranging from the surface to a depth of 25 meters, and lies entirely within the second ghost band from 37.5 to 50 meters. A source that radiates from 20-30 Hz only just fits within the third ghost band at a tow depth of 75 meters. For a more realistic minimum source amplification factor of 0.25 or 0.5, the third ghost band would not be usable. However, if the bandwidth of the source were reduced, then the third ghost band would expand and become usable.

The narrower the bandwidth, the more ghost bands that may be used. Thus, the difficulty with a single broadband source can be seen: to avoid notches, it must be towed at a depth shallow enough so that its entire frequency range lies within the first ghost band. For some types of sources, this depth may be too shallow to avoid cavitation.

If no ghost band meets both criteria (wide enough to contain the frequency range, deep enough to avoid cavitation) for a given source, then in some embodiments the source will be replaced by two narrower-band sources, and the criteria re-applied to each source. If the array consists of sources of equal bandwidth with non-overlapping bands (except possibly for a taper zone between adjacent frequency bands) then successively higher-frequency sources can be operated in successively higher ghost bands, such that sources may be deployed at equal or nearly equal depths.

Figure 4:
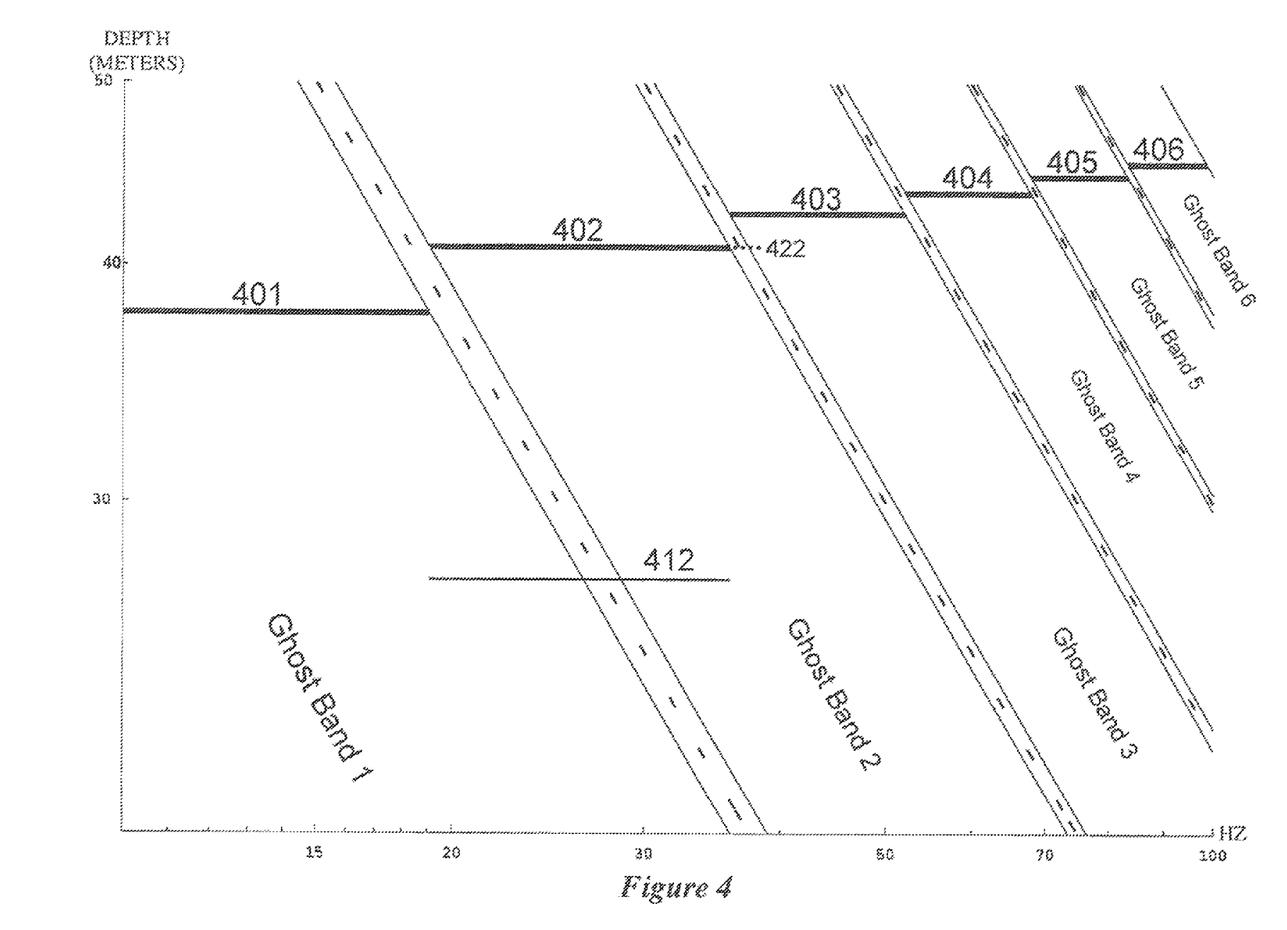
FIG. 4 contains an illustration of one possible configuration of an array of swept-frequency sources.
Figure 5A:
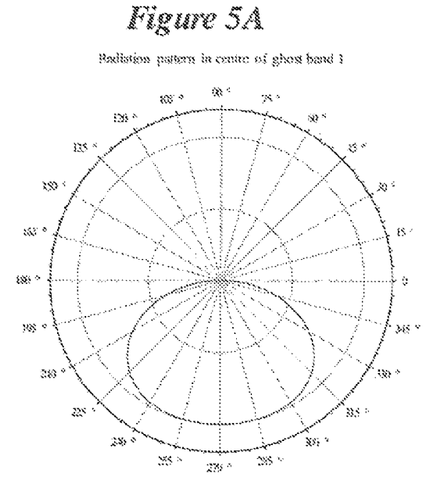
FIGS. 5A-5D contain 2D radiation patterns for different ghost bands.
Figure 5B:
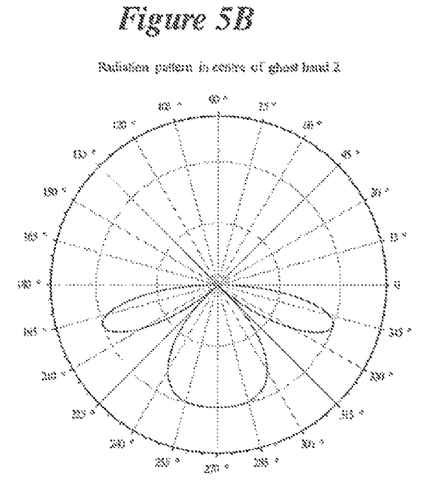
Figure 5C:
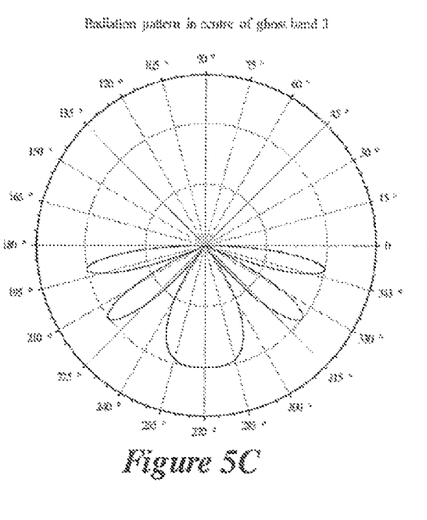
Figure 5D:
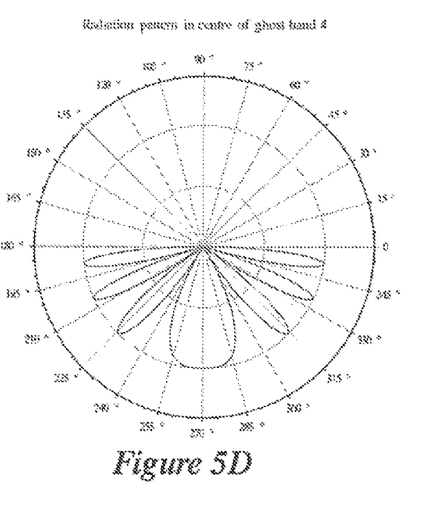

FIG. 4 shows a graphical example of how this can be done. Note the hyperbolas in FIG. 3 have become straight lines by plotting frequency and depth on a log-log graph. This representation makes the methodology much easier to visualize. In this example the minimum acceptable source amplification factor is 0.25, so the notch zones are somewhat narrower than the example in FIG. 3. Source 401 is towed at a depth of 37.75 meters and spans ghost band 1. This source hands off to source 402 towed at a depth of 40.9 meters in ghost band 2 at 19.3 Hz. Source 402 in turn hands off to source 403 towed at a depth of 42.6 meters in ghost band 3 at 36.4 Hz, and so on up to source 406 in ghost band 6 which extends up to 100 Hz. See Table 1 below for a listing of the frequency ranges and depths of all six sources. This array of sources spans 10-100 Hz between them, without gaps. By way of comparison, a conventional broadband source spanning 10-100 Hz would have to be towed at a depth no deeper than 7.5 meters, the depth of the first notch at 100 Hz.

TABLE 1

| Source | Ghost Band | Top Freq (Hz) | Bottom Freq (Hz) | Depth (m) |
|---|---|---|---|---|
| 406 | 6 | 100 | 84.5604 | 45.2968 |
| 405 | 5 | 84.5604 | 68.8725 | 44.5797 |
| 404 | 4 | 68.8725 | 52.8686 | 43.6993 |
| 403 | 3 | 52.8686 | 36.4322 | 42.5523 |
| 402 | 2 | 36.4322 | 19.3289 | 40.8885 |
| 401 | 1 | 19.3289 | 10. | 37.7509 |

The preceding analysis applies to vertically traveling waves, which is a good approximation when sources and receivers are not widely separated, i.e. for so-called "narrow-offset acquisition". For recordings at wider offsets (increasingly the norm) we may also need to consider non-vertical propagation, which introduces some additional complexity in the acquisition design.

Sources placed conventionally, in the first ghost band, radiate maximal acoustic energy downwards (at 90-degree dip, or zero degrees from the vertical), falling off smoothly with decreasing dip to zero amplitude for energy traveling horizontally (0-degree dip, or 90 degrees from vertical). In contrast, a source placed in the nth ghost band has a more complex radiation pattern, with n−1 zero-amplitude dip angles (not counting the horizontal) separated by n lobes with large amplitudes. FIG. 5 shows radiation patterns for sources at the centers of ghost bands 1 through 4, demonstrating the notches for non-vertical propagation that occur for the deeper ghost bands.

For some applications this more complex radiation pattern may pose no difficulty. For example, higher frequencies attenuate relatively quickly with increasing distance, and so at relatively high frequencies only energy traveling close to vertical may be of interest, in which case notches at wider offsets at those frequencies will not matter. For some algorithms such as Full Waveform Inversion the notches may cause no difficulties, so long as they are properly accounted for in the modeling step of the algorithm. The notches in the radiation pattern are just another property of the source that the inversion accounts for.

If the radiation pattern is not acceptable for a given frequency range, one may produce those frequencies from sources at two (or more) different depths, chosen such that at least one source adequately emits each required frequency at each required dip. Note sources at different depths may apportion frequencies among bands the same way, or differently. The simplest solution is simply to acquire data in two (or more) passes, with sources at different depths on each pass.

Alternatively, the sources at different depths may be distinguished from each other during acquisition (either by time, location, source signature, or shot pattern). The required radiation pattern (or patterns) may then be synthesized digitally in the computer as part of the seismic pre-processing, using techniques proposed in, for example, Dellinger and Abma, 2010, "Distance- and frequency-separated swept-frequency seismic sources", WO 2012/078966 A2, which distinguishes sources by frequency and location, or Hegna and Parks, 2010, "Method for acquiring and processing marine seismic data to extract and constructively use the up-going and down-going wave-fields emitted by the source(s)", U.S. 2010008184, which distinguishes sources by initiation time pattern and is incorporated herein by reference as if fully set out at this point. Swept-frequency sources may also be distinguished by sweep direction and sweep length. Sources with signatures that may be precisely controlled, e.g. underwater loudspeakers, may be distinguished by exciting them with orthogonal pseudo-random sequences.

Figure 6:
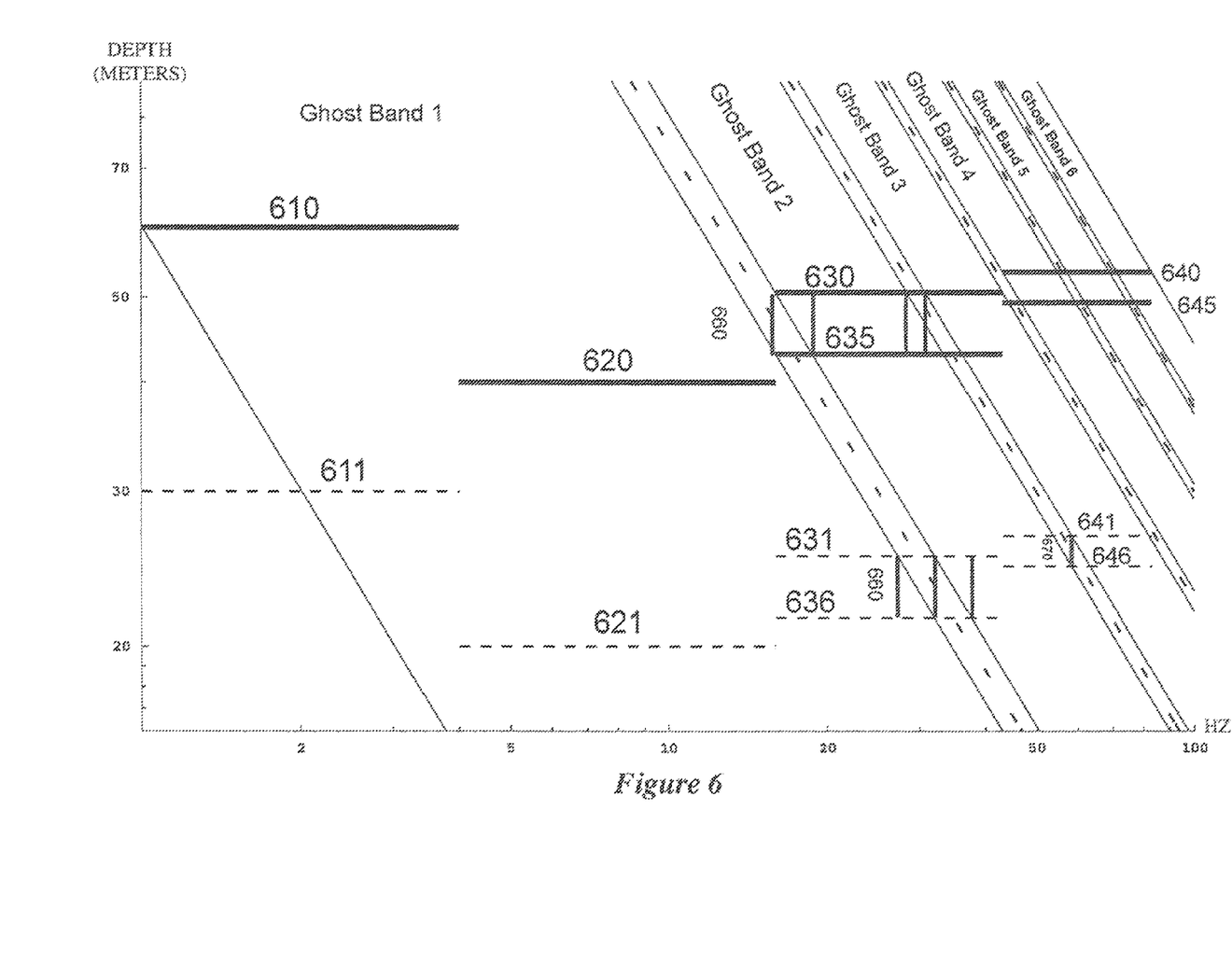
FIG. 6 contains an illustration of a possible array of swept-frequency sources with paired sources at differing depths, to increase the wide-offset performance of the array.

FIG. 6 shows an example of an array of six sources spanning 1-80 Hz such that there are no notches for angles from the vertical out to 60 degrees and all sources are towed at depths between 40 and 60 meters, and the minimum source amplification factor for all the frequencies and dip angles within these limits is 0.5. Table 2 enumerates the six sources in this array.

TABLE 2

| Source | Ghost Band | Top Freq (Hz) | Bottom Freq (Hz) | Depth (m) |
|---|---|---|---|---|
| 645 | 4-6 | 83.08 | 43.24 | 49.30 |
| 640 | 4-6 | 83.08 | 43.24 | 53.44 |
| 635 | 2-3 | 43.24 | 16 | 43.10 |
| 630 | 2-3 | 43.24 | 16 | 50.65 |
| 620 | 1 | 16 | 4 | 40 |
| 610 | 1 | 4 | 1 | 60 |

In FIG. 6, sources 610 and 620 are both within the first (conventional) ghost band. Note that splitting the first ghost band between two sources will make it possible to cover a broader frequency range within the first ghost band. The conventional strategy would be to continue on in this way for higher frequencies, with progressively shallower sources tracking the first ghost band to higher frequencies. However, cavitation would then become a problem at higher frequencies for non-impulsive sources. Instead, the choice has been made here to jump to the second ghost band with source 630 at 16 Hz, allowing this source to be placed deeper instead of shallower.

Source 630 is paired with a second source 635. Here the ratio of the depths between them is chosen so that source 635 is at the shallow limit of the ghost notch zone between ghost bands 1 and 2 when source 630 is at the deep limit of that ghost notch zone. This is the minimum depth separation that ensures coverage at every frequency over the bandwidth of those sources (660 in FIG. 6). Note if there are two sources covering a frequency, then the limits on the source depths are less restricted; it is necessary only to ensure that one or the other source covers each frequency adequately. What is restricted is the minimum depth offset (expressed as a depth ratio) between the two sources at the same frequency.

For non-vertical propagation, the source depth is effectively multiplied by the cosine of the angle from the vertical. On a log-log plot like FIG. 6, multiplication by a constant depth scale factor corresponds to a constant vertical shift. The cosine of 60 degrees is one half, so for propagation at 60 degrees from the vertical the source depths effectively halve. This is shown by the dotted lines 611, 621, 631, 636, 641, and 646, corresponding to solid lines 610, 620, 630, 635, 640, and 645 respectively, but for propagation at 60 degrees from the vertical. Note the minimum depth ratio 660 that spans the notch zone between ghost bands 1 and 2 remains the same after the shift, i.e., in FIG. 6 the vertical separation between 630 and 635 (660) is the same as the vertical separation between 631 and 636 (also 660). This represents a minimum separation; it could also be larger than this.

Sources 630 and 635 hand off to sources 640 and 645 at 43.24 Hz. These sources are spaced in depth (shown by 670 in FIG. 6) so as to just span the notch zone between ghost bands 2 and 3, which is the widest notch zone those sources need to span over their frequency range and for propagation angles between vertical and 60 degrees.

FIG. 6 demonstrates a methodology for designing an array of sources spanning a desired range of frequencies, depths, minimum source amplification factors, and propagation angles. There are many possible ways of doing this and those skilled in the art will readily see how the principles can be applied to other array specifications. The key is to note which notch zones must be spanned within the frequency and dip range of each proposed source. The widest of these determines the minimum ratio of depths between sources. The depth ranges of the sources are controlled by the choice of how to allocate them among the ghost bands, and the need to have each of the sources deep enough to avoid cavitation.

Although in this example the sources operate in pairs spanning identical frequency ranges (i.e. 630 and 635, 640 and 645) that is not a requirement of the method. The shallower and deeper sources could instead partition frequencies differently.

Figure 7:
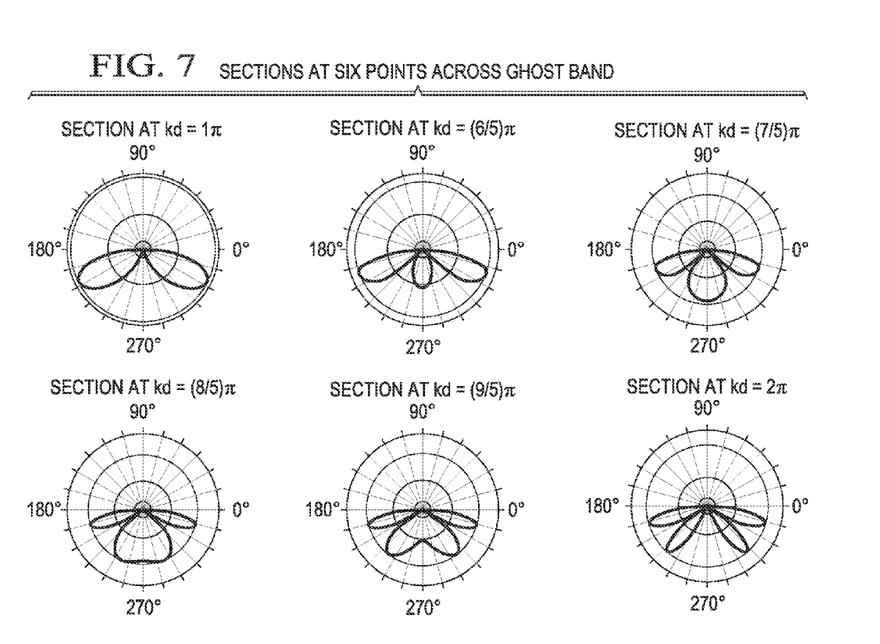
FIG. 7 contains illustrations of radiation patterns at six points across the ghost band for a single source.

Depending on the required range of dips and frequencies and the types of sources used, it is often also possible to construct a source array that directly generates a desirable radiation pattern in the field. FIG. 7 shows polar diagrams for a single source in the second ghost band. The polar diagrams correspond to different values of the k–d product across the ghost band (here "kd" means the product of wavenumber k and depth d, which ranges from $(n-1)\pi$ to $n\pi$ across ghost band n). The polar diagram has a null in the vertical direction at the lowest kd (kd=$\pi$), corresponding to the notch between ghost bands 1 and 2. As kd increases, this null divides into two nulls on either side of the vertical. These move away from the vertical with increasing kd, ending up at ±60° at the highest kd (kd=$2\pi$), when a new null appears at the vertical, corresponding to the notch between ghost bands 2 and 3. In this example the source amplification factor varies between 0 (at a notch) and 2 (for perfect constructive summation).

Figure 8:
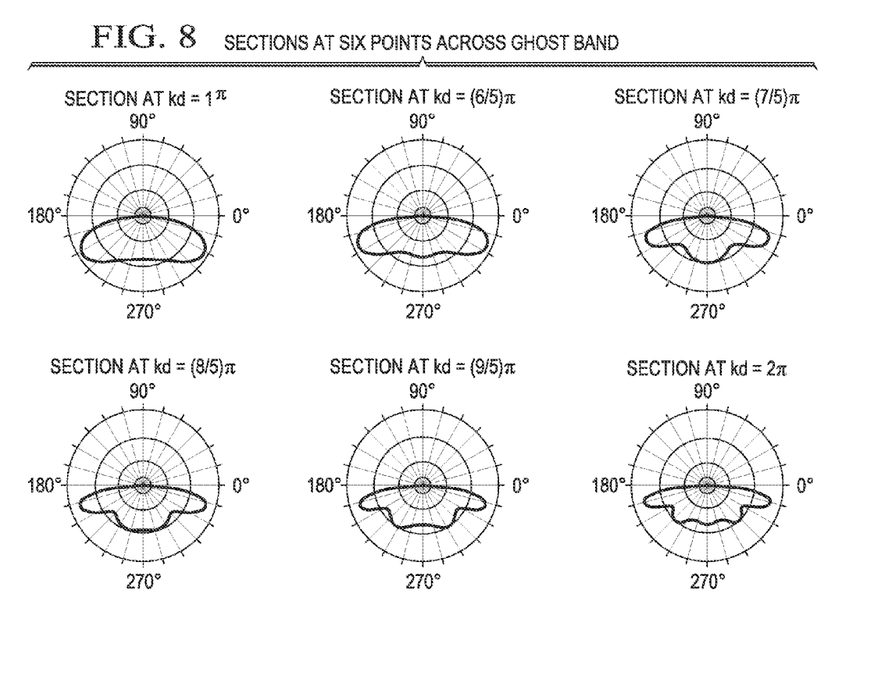
FIG. 8 contains illustrations of radiation patterns at six points across the ghost band for a pair of sources.

FIG. 8 shows the corresponding figure with a second source at two-thirds the depth of the first and with a phase shift of 90° relative to the first. Thus in this example it is assumed that there are two sources whose phase can be controlled. This combination has a radiation pattern that is free of nulls over the limited frequency band covered by the sources (apart from the horizontal direction, where a null is unavoidable). Here the source amplification factor (relative to a single source) varies between about 1.5 and 2.7. Note in this case the radiation pattern is actually wider-offset than a single source in the first ghost band could produce. Note the second source may also be deeper than the first, instead of shallower as shown here.

Sources 402 and 412 in FIG. 4 show the arrangement from FIG. 8 for a pair of sources in ghost band 2. Note the depth of the $2^{nd}$ source (412) at ⅔ the depth of the $1^{st}$ source (402) shifts the notch zone by exactly half the frequency bandwidth of the source. The source array of FIG. 4 can be augmented with a single additional source in this way if it were desired to avoid notches for non-vertical propagation for frequencies up to 36 Hz, but notches at wide offset for higher frequencies can be tolerated (hence there is only one source for those frequencies).

If the relative phases between sources 402 and 403 where they adjoin can be controlled, the bandwidth of 402 across the notch zone could be extended (e.g. 422) to mitigate that notch for a range of near-vertical propagation angles. If the relative phases cannot be controlled, techniques for separating sources that are well known to those of ordinary skill in the art could instead be applied in the frequency overlap zone. This methodology could also be applied at the joins between sources 403 and 404, and 404 and 405, etc., as well. While this would not eliminate notches at wide offsets, it would eliminate notches for near-vertical propagation, which is likely to be the signal of interest for higher-frequency sources.

The preceding examples serve to illustrate methodologies for designing an array of controlled-frequency sources. For each possible source, the following will be useful information:
 i. Maximum amplitude (may be a function of the time interval it is summed over);
 ii. Minimum and maximum usable frequency;
 iii. Minimum and maximum operating depth at each frequency;
 iv. Whether or not the source phase is controllable; and,
 v. Whether or not the source produces harmonics.

For the imaging problem to be solved, the following will be useful information:
 i. Minimum and maximum frequency desired;
 ii. Minimum required notch-free propagation angle (may be a function of frequency);
 iii. Minimum shot spacing required at each frequency. (When combined with tow speed, this determines the shot time interval at that frequency); and,
 iv. Required total amplitude as a function of frequency (summed over that shot spacing).

The desired frequency spectrum is then, according to one example, apportioned into 3 regimes:
 i. Low frequencies where the sources can be placed in the first ghost band, following conventional practice.
 ii. Intermediate frequencies where higher ghost bands are required to avoid cavitation, and energy is required out to wide offsets.
 iii. High frequencies where higher ghost bands are required to avoid cavitation, but only narrow-offset energy is required.

Sources chosen from those available then can be apportioned among the three cases. The sources should be capable of producing the required amplitude summed over the required shot interval, which depends on the required minimum shot spacing at that frequency divided by the tow speed. If the chosen sources produce harmonics then these will also be accounted for.

For the low-frequency regime, only one source will usually be necessary for each frequency. In most cases the sources should be positioned to approximately track the center of the ghost band where the efficiency is optimal. For the high-frequency regime, again only one source will typically be required for each frequency, possibly with some overlap for frequencies near the ghost notch, so that the notch zone is avoided for a range of angles near vertical (instead of just exactly at vertical). In both of these cases careful attention needs to be paid to the ghost-band boundaries.

For the intermediate-frequency regime there should be sources at two different depths for each frequency. The depth ratio will usually need to be sufficient to span the widest ghost notch that lies within the desired offset range for that frequency. If the source phases are controllable, then it may be desirable to produce the desired antenna response directly in the field. Otherwise, source separation techniques may be applied to separate the signals from the sources at two different depths and the desired antenna response, or responses, synthesized during processing in a computer. Note in this regime the source frequency ranges may span ghost-band boundaries, because at each frequency we have sources at two different depths, at most one of which will lie within a ghost-notch zone at each frequency.

Source separation techniques will usually be applied to avoid conflict between sources with adjacent, overlapping, or coincident frequency ranges using techniques proposed in, for example, Dellinger and Abma, 2010, "Distance- and frequency-separated swept-frequency seismic sources", WO 2012/078966 A2, which distinguishes sources by frequency and location.

Figure 9:
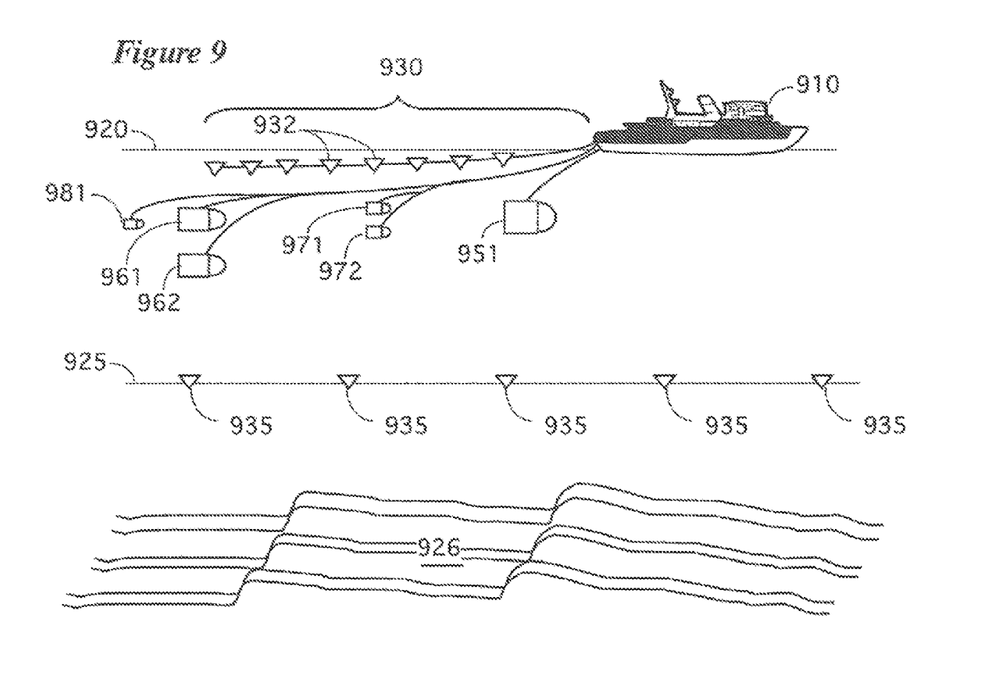
FIG. 9 illustrates source configurations suitable for use with the instant invention.

FIG. 9 contains an exemplary illustration of how the instant invention might be utilized in practice. In one arrangement a seismic boat 910 will tow one or more seismic streamers 930 over the surface of the ocean 920 above a target of exploration interest in the subsurface 926. Each streamer 930 will contain a plurality of seismic receivers 932 (i.e., hydrophones) as is conventionally done. Note that, although FIG. 9 illustrates the seismic streamers 930 being towed by the same boat that tows the seismic sources (discussed below), in practice, the sources will typically be towed by a separate boat as is conventionally done.

Additional receivers 935 can be provided on the ocean floor 925 or, depending on the nature of the survey, only ocean bottom receivers 935 or towed streamers 930 can be used.

Additionally, and according to an embodiment of the instant invention, at least two different types of sources will be towed by the source boat 910. Preferably, and has been discussed previously, there will be one or more low frequency sources 951, in combination with some number of increasingly higher frequency sources 961 and 962, 971 and 972, and 981. For purposes of illustration only, the relative sizes of the sources in FIG. 9 have been varied to reflect in a general way their center frequency. This is not intended in any way to be interpreted as a requirement that in practice the sources would be so constrained in a relative or absolute size.

Although sources are shown vertically over each other in FIG. 9, the combined radiation pattern may be further modified by offsetting the second source horizontally from the first, which can be used to produce an asymmetric radiation pattern if desired.

In practice, as is known to those skilled in the art, it may be desirable to operate two or more sources together in a synchronized manner, so that they produce identical signals and together function as a single, more powerful source.

By way of further explanation, it is well known to those of ordinary skill in the art that the water surface is essentially a mirror that reflects pressure with a polarity change (i.e., because the pressure at the surface is zero, the up going plus down going waves must sum to zero there and, hence, the up going and down going waves must be equal but opposite there.)

As a consequence, if "d" is the source depth, the instant situation can be conceptualized as a homogeneous medium with an anti-source a distance of "2d" above the actual source. In this case, a notch is created whenever 2d is an integer multiple of the wavelength and a doubling when 2d is a half-integer multiple of the wavelength. The wavelength is the speed of sound in water, about 1500 m/s for example, times the period (i.e., distance=Rate×Time) and the period if 1/F, where "F" is the frequency in Hz.

Thus, a notch will be created when k*1500/F=2d, where "k" is an integer. That is, where d=k*750/F. By way of example, for 8 Hz, the first notch is at 94 meters. At 4 Hz, the first notch is at 187 meters.

For constructive summation, the tow depth should be chosen such that d=(k+½)*750/F. Thus, at 8 Hz, the first peak will be at 47 meters, at 4 Hz, the peak will be at 94 meters. At 2 Hz, there will be a peak at 188 meters, and at 1 Hz, a peak will occur at 375 meters.

If it is desired to optimize the amplitudes over an entire sweep range, a depth that placed the constructive summation peak at about ¾ of the maximum sweep frequency would be acceptable. If the peak were to be placed in the middle of the band, the notch would be expected to be at the upper end which would be undesirable. So, in some embodiments it might be desirable to split the difference between one and ½ of the peak frequency. So, for 8 Hz that would correspond with a tow depth of about 60 meters.

A problem with low frequencies is getting away from the notch at k=0, i.e., for low enough frequencies the source will need to be placed "too near the surface." To see how the amplitude varies away from the notch at d=0, add the sine waves from the source and anti-source:

$$\sin\left(\frac{2\pi(x+d)F}{1500}\right) - \sin\left(\frac{2\pi(x-d)F}{1500}\right) = 2\cos\left(\frac{F\pi x}{750}\right)\sin\left(\frac{dF\pi}{750}\right)$$

Thus, the variation of amplitude with source depth d is:

$$\sin\left(\frac{dF\pi}{750}\right)$$

Using the small-d approximation, i.e., sin(d)=d, and Pi/750 is approximately 0.004, thus the amplitude will be approximately equal to:

$$dF*0.4\%.$$

This should be a good approximation for depths that are shallow compared to the wavelength, i.e., at shallow depths, at 1 Hz there is a gain of 0.4% more amplitude for each meter the source is moved away from the free surface. At 2 Hz, the gain is 0.8%, at 8 Hz the gain is 3.2%, etc.

The math above easily generalizes to non-vertical propagation. In that case, only the component of displacement between the source and the mirror-image anti-source parallel to the direction of propagation matters. This scales the effective depth d of the source by the cosine of the angle between the direction of propagation and the vertical. If the angle is 90 degrees, the cosine of 90 degrees is zero, and thus there is a notch for all frequencies for horizontal propagation. At 60 degrees from vertical the effective depth is halved, because the cosine of 60 degrees is one half.

An important concept that is utilized by the instant invention but which has not been recognized by the prior art is how to use the deeper peaks. Previously, seismic survey designers just used the first (i.e., shallowest) peak for non-impulsive sources. For example, in the prior art it is known to vary the depth of a swept-frequency source to keep it at an optimal depth at the first ghost peak, even as the frequency varies. See, for example, Laws et al., 2007, "Method of seismic surveying, a marine vibrator arrangement, and a method of calculating the depths of seismic sources", U.S. Pat. No. 7,257,049. Laws et al. also propose swept-frequency sources at two or more depths, but does not attempt to make use of the fact that different sources may cover different frequency ranges. All the sources sweep over the full frequency range, and as a result they are all relatively shallow (15 meters or less).

The instant inventors have observed that if a limited bandwidth is available (as, practically speaking, it always is for swept-frequency sources), then deeper tows may be possible because a given depth may be within the ghost band for the entire frequency range of a limited-bandwidth source.

While the invention has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of marine seismic exploration or surveillance, comprising:
    selecting a first seismic source, said first seismic source comprising a swept-frequency source;
    determining at least an approximate bandwidth of said seismic source;
    using at least said approximate bandwidth of said seismic source to determine a source depth such that substantially all of said bandwidth falls between a first ghost notch and a second ghost notch wherein said first ghost notch and said second ghost notch each may be any one of the notches occurring at regular intervals of frequency except for a zero frequency ghost notch, said source depth comprising a source depth of 25 meters or greater, thereby creating a survey plan; and,
    collecting at least one seismic trace by activating said first seismic source according to said survey plan.

2. A method of marine seismic exploration or surveillance, comprising:
    selecting a first seismic source, said first seismic source comprising a swept-frequency source and having a first bandwidth associated therewith;
    using at least a portion of said first bandwidth to determine a first source depth such that substantially all of said bandwidth falls between a first ghost notch and a second ghost notch, thereby creating a survey plan, said first source depth comprising a first source depth of 25 meters or greater; and,
    collecting at least one seismic trace by activating said first seismic source at said first source depth according to said survey plan.

3. The method of marine seismic exploration or surveillance according to claim 2, further comprising the steps of:
    selecting a second seismic source having a second bandwidth different from said first bandwidth, said second seismic source comprising a swept-frequency source;
    using at least a portion of said second bandwidth to determine a source depth such that substantially all of said second bandwidth fails between the second ghost notch and a third ghost notch, thereby creating a two-source survey plan, wherein said second seismic source has a second source depth of 25 meters or greater, said second source depth comprising a different depth than said first source depth; and,
    collecting at least one seismic trace by activating said first seismic source and said second seismic source according to the two-source survey plan.

4. The method according to claim 3, with additional sources added according to the same methodology to create a multi-source survey plan.

5. A method of marine seismic exploration or surveillance, comprising the steps of:
    selecting a minimum source amplification factor, the minimum source amplification factor determining the width of the notch zones around each ghost notch;
    selecting a range of required acquisition frequencies;
    selecting a range of required offsets/angles for each frequency in that range;
    partitioning the aforesaid range of frequencies into 3 regimes, one or more regimes selectively used in an application, the regimes comprising:
        1) frequencies for which sources may be located within the first ghost band at a deep enough depth that cavitation is not a factor, enabling "conventional acquisition";
        2) frequencies for which the first ghost hand is too shallow to use, requiring use of higher-frequency and thus deeper-depth ghost bands, and for which ghost notch zones lie within the range of required offsets/angles for frequencies in that range;
        3) frequencies for which the first ghost band is too shallow to use, requiring use of higher-frequency and thus deeper-depth ghost hands, and for which no ghost notch zones lie within the range of required offsets/angles for frequencies in that range;
    using a method to span the range of frequencies falling within regime 3, the method comprising:
        selecting a first seismic source, said first seismic source comprising a swept-frequency source;
        determining at least an approximate bandwidth of said seismic source;
        using at least said approximate bandwidth of said seismic source to determine a source depth such that substantially all of said bandwidth falls between a first ghost notch and a second ghost notch wherein said first ghost notch and said second ghost notch each may be any one of the notches occurring at regular intervals of frequency except for a zero frequency ghost notch, said source depth comprising a source depth of 25 meters or greater, thereby creating a survey plan;
        collecting at least one seismic trace by activating said first seismic source according to said survey plan:
    and
    for frequencies within regime 2, deploying sources at two or more different depths so the polar diagrams of the two or more sources do not simultaneously all contain zeros within the desired range of angles centered on the downward vertical determined for any frequency within the frequency range spanned by those sources and regime 2.

6. The method according to claim 5, with the depths of two sources separated by half the width of the ghost band, allowing the two sources operating simultaneously to produce a combined polar diagram in the field that has no zeros within the desired frequency and angular range.

7. The method according to claim 5, wherein the frequency ranges of sources within or approaching the ghost-notch zone for near-vertical angles partially overlap, so that frequencies within the ghost-notch zone for near-vertical angles are covered by two sources at different depths, the depths being different enough that one source always lies outside the ghost-notch zone when the other lies within it for near-vertical angles.

* * * * *